(12) United States Patent
Marinier et al.

(10) Patent No.: US 7,941,626 B2
(45) Date of Patent: May 10, 2011

(54) METHOD AND APPARATUS FOR CONTROLLING DISCONTINUOUS TRANSMISSION AND RECEPTION

(75) Inventors: Paul Marinier, Brossard (CA); Christopher R. Cave, Verdun (CA); Eldad M. Zeira, Huntingjton, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 634 days.

(21) Appl. No.: 11/948,148

(22) Filed: Nov. 30, 2007

(65) Prior Publication Data

US 2008/0132230 A1 Jun. 5, 2008

Related U.S. Application Data

(60) Provisional application No. 60/868,154, filed on Dec. 1, 2006.

(51) Int. Cl.
*G06F 12/00* (2006.01)
(52) U.S. Cl. ........ 711/167; 711/154; 370/252; 370/277; 370/278; 370/282; 455/434
(58) Field of Classification Search .................. 711/167, 711/154; 370/252, 277, 278, 282; 455/434
See application file for complete search history.

(56) References Cited

U.S. PATENT DOCUMENTS

| | | | |
|---|---|---|---|
| 6,782,274 B1 * | 8/2004 | Park et al. .................. | 455/552.1 |
| 6,804,530 B2 * | 10/2004 | Chheda et al. ................ | 455/522 |
| 7,089,004 B2 * | 8/2006 | Jeong et al. .................... | 455/436 |
| 2003/0123396 A1 * | 7/2003 | Seo et al. ........................ | 370/252 |
| 2003/0185159 A1 * | 10/2003 | Seo et al. ........................ | 370/278 |
| 2004/0023634 A1 * | 2/2004 | Jeong et al. .................... | 455/403 |
| 2005/0207359 A1 * | 9/2005 | Hwang et al. ................. | 370/278 |
| 2010/0220606 A1 * | 9/2010 | Niwano ........................ | 370/252 |

OTHER PUBLICATIONS

Nokia, "Uplink DPCCH gating, general description," 3GPP TSG-RAN WG2 Meeting #54, R2-062202, Tallinn, Estonia Aug. 28-Sep. 1, 2006, 6 pages, relevant pp. 1-6.
Qualcomm, Nokia, Ericsson, Siemens, Philips (Change Request) "Support of CPC feature", 3GPP TSG-RAN WG1 Meeting #46bis, Seoul, Korea, Oct. 9-13, 2006, R1-063016, 57 pages, relevant pp. 43-45.
Qualcomm, Nokia, Ericsson, Siemens, Philips (Change Request) "Support of CPC feature", 3GPP TSG-RAN WG1 Meeting #46bis, Seoul, Korea, Oct. 9-13, 2006, R1063014, 12 pp., relevant pp. 1-12.
Nokia, Ericsson, Qualcomm "Uplink DPCCH and HS-SCCH gating, general description", 3GPP TSG-RAN WG1 Meeting #46, Tallinn, Estonia, Aug. 28 - Sep. 1 2006, R1062395, 5 pages, relevant pp. 1-5.

(Continued)

*Primary Examiner* — Stephen C Elmore
(74) *Attorney, Agent, or Firm* — Woodcock Washburn LLP

(57) ABSTRACT

A method and apparatus for controlling discontinuous transmission and reception are disclosed. A Node-B schedules an offset for discontinuous transmission (DTX) and/or discontinuous reception (DRX) for a user equipment (UE) and sends the offset to the UE. The UE then shifts the DTX and/or DRX pattern based on the received offset. The UE may modify the offset based on the transmission time of an activation command for DTX and DRX. The UE may modify an offset for DTX and DRX to shift the DTX pattern and DRX pattern when the UE receives downlink data or transmits uplink data based on a sub-frame number at the time of the downlink reception and uplink transmission.

40 Claims, 5 Drawing Sheets

OTHER PUBLICATIONS

Third Generation Partnership Project, "Technical Specification Group Radio Access Network; Continuous Connectivity for Packet Data Users" (Release 7) 3GPP Tr 25.903 V1.2.0 (Nov. 2006), 131 pages, relevant pp. 29-33 and 85.

Third Generation Partnership Project, "Technical Specification Group Radio Access Network; Continuous connectivity for packet data users" (Release 7) 3GPP Tr 25.903 V7.0.0 (Mar. 2007), 138 pages, relevant pp. 32-36 and 90.

* cited by examiner

METHOD AND APPARATUS FOR CONTROLLING DISCONTINUOUS TRANSMISSION AND RECEPTION

CROSS REFERENCE TO RELATED APPLICATION

This application claims the benefit of U.S. provisional application No. 60/868,154 filed Dec. 1, 2006, which is incorporated by reference as if fully set forth.

FIELD OF INVENTION

The present invention is related to wireless communications.

BACKGROUND

Third generation partnership project (3GPP) release 7 specifications introduce continuous packet connectivity (CPC) enhancements. CPC is a mode that a user equipment (UE) is allocated with resources, but transmits and/or receives discontinuously, (i.e., transmits and/or receives only in a subset of uplink and downlink sub-frames), during data inactivity while continuous operation is possible, (i.e., may transmit and receive in all sub-frames), whenever needed. The discontinuous uplink transmission and downlink reception increases system capacity and battery life of the UE.

For implementing the CPC, a higher layer, (e.g., radio resource control (RRC) layer), defines parameters for discontinuous transmission (DTX) and discontinuous reception (DRX) to set up the transmission and reception patterns and triggers. One of the parameters is "UE_DTX_DRX_Offset" that jointly controls an uplink dedicated physical control channel (DPCCH) transmission offset and a downlink high speed shared control channel (HS-SCCH) reception offset in sub-frames. By controlling the offsets of each UE, the network can ensure that the transmission and reception instants of different UEs are adequately spread over time.

DTX and DRX may be used for different applications. One of the applications is voice over Internet protocol (VoIP). With VoIP, the UE may be inactive in reception and/or transmission during a significant fraction of the time not only during uplink and downlink silence periods but also during voice active periods under certain conditions.

On the uplink, enabling DTX results in the UE transmitting the uplink DPCCH only according to the transmission pattern provided that certain conditions are satisfied, (e.g., no enhanced dedicated channel (E-DCH) transmission, no need to transmit pre-amble or post-amble, no high speed dedicated physical control channel (HS-DPCCH) transmission, and the like). The transmission pattern is defined based on the UE_DTX_DRX_Offset and a connection frame number (CFN) of the UE. Enabling DTX results in a direct capacity improvement since less interference is generated on the uplink. Such reduction of interference is achieved even during voice-active periods on the uplink if the UE is sufficiently close to a Node-B to be able to use a 2 ms transmission time interval (TTI), because not all hybrid automatic repeat request (HARQ) processes need to be used with the voice application with the 2 ms TTI.

On the downlink, enabling DRX results in the UE turning on its receiver only during user or control data reception and for a defined period afterwards, after which the UE is allowed to turn its receiver off according to a reception pattern. This allows the UE to save battery during voice-inactive periods on the downlink. This also allows UEs that are sufficiently close to the cell center to turn off their receivers intermittently during voice-active periods, since these UEs may receive at high instantaneous data rates and therefore during a fraction of the available TTIs. For instance, the RRC may configure DRX with the parameter Inactivity_Threshold_for_UE_DRX_cycle set to 0 sub-frame and the UE_DRX_cycle parameter set to 4 sub-frames. Thereafter, the Node B may schedule transmission for the UE only during the sub-frames where the UE should wake-up according to the pattern (1 out of 4).

Periods of activity and inactivity in a typical voice session alternate at a frequency that is generally too high to be tracked by RRC signaling without incurring unacceptable signaling load and delays. In accordance with one of the CPC implementation proposals, the UE_DTX_DRX_Offset is set by a higher layer, such as RRC. This means that during the course of a voice connection, the UE_DTX_DRX_Offset parameter remains to a fixed value.

Such restriction may reduce significantly the potential battery savings obtainable by the use of DRX on the downlink when the cell is operating near the maximum capacity because the use of DRX constrains the Node-B to schedule the UE during certain subsets of TTI only. As periods of voice activity and inactivity are not correlated between UEs, it will frequently happen that there will be an above-average number of voice-active UEs that can be scheduled for transmission in a given set of periodically spaced TTIs. Such situation would result in congestion (high latency) for the concerned UEs unless the Node-B disables the DRX for some of these UEs to schedule their transmissions in other TTIs.

On the uplink, the fact that the UE_DTX_DRX_Offset parameter is fixed is sub-optimal from the system capacity point-of-view because the system capacity may only be maximized if the set of voice-inactive UEs have staggered transmission patterns (with approximately equal number of voice-inactive UEs transmitting the DPCCH at a given time). This situation cannot be realized with a fixed UE_DTX_DRX_Offset since the set of voice-inactive UEs changes dynamically.

SUMMARY

A method and apparatus for controlling discontinuous transmission and reception are disclosed. A Node-B schedules an offset for DTX and/or DRX for a UE and sends the offset to the UE. The UE then shifts the DTX and/or DRX pattern based on the received offset. The UE may modify the offset based on the transmission time of an activation command for DTX and DRX. The UE may modify an offset for DTX and DRX to shift the DTX pattern and DRX pattern when the UE receives downlink data or transmits uplink data based on a sub-frame number at the time of the downlink reception and uplink transmission.

BRIEF DESCRIPTION OF THE DRAWING

A more detailed understanding may be had from the following description, given by way of example and to be understood in conjunction with the accompanying drawing wherein.

DETAILED DESCRIPTION

When referred to hereafter, the terminology "UE" includes but is not limited to a wireless transmit/receive unit (WTRU), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Embodiments described herein are applicable to any wireless communication systems employing discontinuous transmission and/or reception including, but not limited to, evolved high speed packet access (HSPA+) and long term evolution (LTE) of 3GPP systems.

Figure 1:
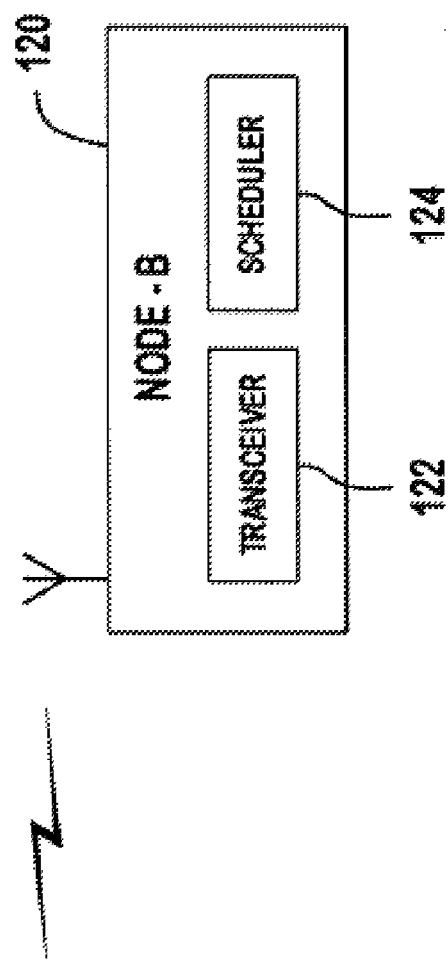
FIG. 1 shows an example UE and Node-B that are configured to control DTX and/or DRX.
Figure 1:
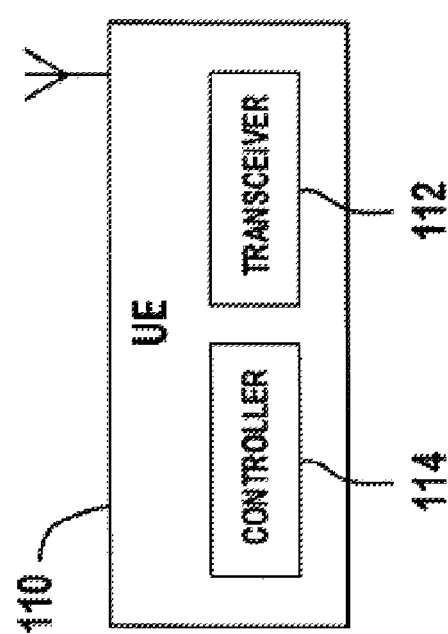

FIG. 1 shows an example UE 110 and Node-B 120 that are configured to control DTX and/or DRX. The UE 110 includes a transceiver 112 and a controller 114. The UE 110 is provided with DTX and/or DRX parameters including an offset for DTX and/or DRX to implement DTX and/or DRX. A DTX pattern and/or a DRX pattern are defined with the parameters. The offset may be a UE_DTX_DRX_Offset for jointly controlling DTX and DRX. Alternatively, the offset may be a separate offset for DTX or DRX. The controller 114 selectively turns on and off the transceiver 112 to discontinuously transmit and/or receive based on the configured parameters.

The Node-B 120 includes a transceiver 122 and a scheduler 124. The scheduler 124 may schedule DTX and/or DRX pattern and sends a signal to the UE 110 to modify the UE_DTX_DRX_Offset, (or separate offsets for DTX and/or DRX), for the UE 110 dynamically. The offset parameter adjustment may alleviate congestion by changing offsets of some UEs instead of removing the DRX functionality altogether. The offset parameter adjustment may also allow the Node-B 120 to optimize the uplink capacity by staggering the transmissions of DPCCH of voice-inactive UEs in DTX, if desired. The uplink optimization may not be performed independently of the downlink optimization. Therefore, the Node-B 120 may signal the separate offsets for DTX and/or DRX instead of the UE_DTX_DRX_Offset. The additional cost in terms of downlink overhead of implementing the signaling is small.

The Node-B 120 may signal the UE_DTX_DRX_Offset as an HS-SCCH order via an HS-SCCH. For example, the HS_SCCH (type 2) carries "special information" bits (7 bits). The 7-bit special information bits may be used to indicate the UE_DTX_DRX_Offset value. For example, if the UE_DTX_DRX_Offset value may vary from 0 to 15, four (4) "special information" bits may be used to indicate the UE_DTX_DRX_Offset value, and the remaining three (3) bits may be used to indicate that the order is related to a change of the UE_DTX_DRX_Offset.

Alternatively, a subset of the UE_DTX_DRX_Offset values may be signaled to the UE 110 beforehand, (e.g., through RRC signaling). For example, the UE 110 may be assigned possible UE_DTX_DRX_Offset values of 3 and 12. In this situation, only one bit is required to identify one of the two values, (e.g., "0" can be mapped to the UE_DTX_DRX_Offset value 3 and "1" can be mapped to the UE_DTX_ DRX_Offset value 12). With this scheme, only one "special information" bit is used to indicate the UE_DTX_DRX_Offset value and six bits are left for other signaling information on the HS-SCCH type 2 channel.

The above signaling mechanism may be used for signaling the separate offsets for DTX and/or DRX. In this case, an additional bit is needed to signal whether the offset applies to the DTX or DRX.

In accordance with another embodiment, a DTX or DRX activation command from the Node-B 120 may be used to shift the DTX and/or DRX patterns by mapping the starting point of the DTX and/or DRX pattern to the transmission time of the activation command. For instance, the offset may be modified upon reception of a DTX or DRX activation command as follows:

$$Offset = S + D;$$

where S is the sub-frame number at the time the activation command is received, and D is a parameter that is either fixed or defined by a higher layer. The offset may be the UE_DTX_DRX_Offset, or independent offsets for DTX or DRX (depending on whether a DTX or DRX activation command is received, respectively).

In accordance with another embodiment, the offset value may be implicitly reset every time the UE 110 receives or transmits data. For instance, the offset value may be reset upon reception of data, (e.g., data on high speed physical downlink shared channel (HS-PDSCH) or on HS-SCCH), or transmission of data, (e.g., data on enhanced dedicated physical data channel (E-DPDCH), as follows:

$$Offset = S + D$$

where S is the sub-frame number at the time the downlink data, (e.g., data on the HS-PDSCH or HS-SCCH, or the like), is received, or the sub-frame number at the time the uplink data, (e.g., data on E-DPDCH, or the like), is transmitted. D is a parameter that may either be fixed or defined by a higher layer.

Figure 2:
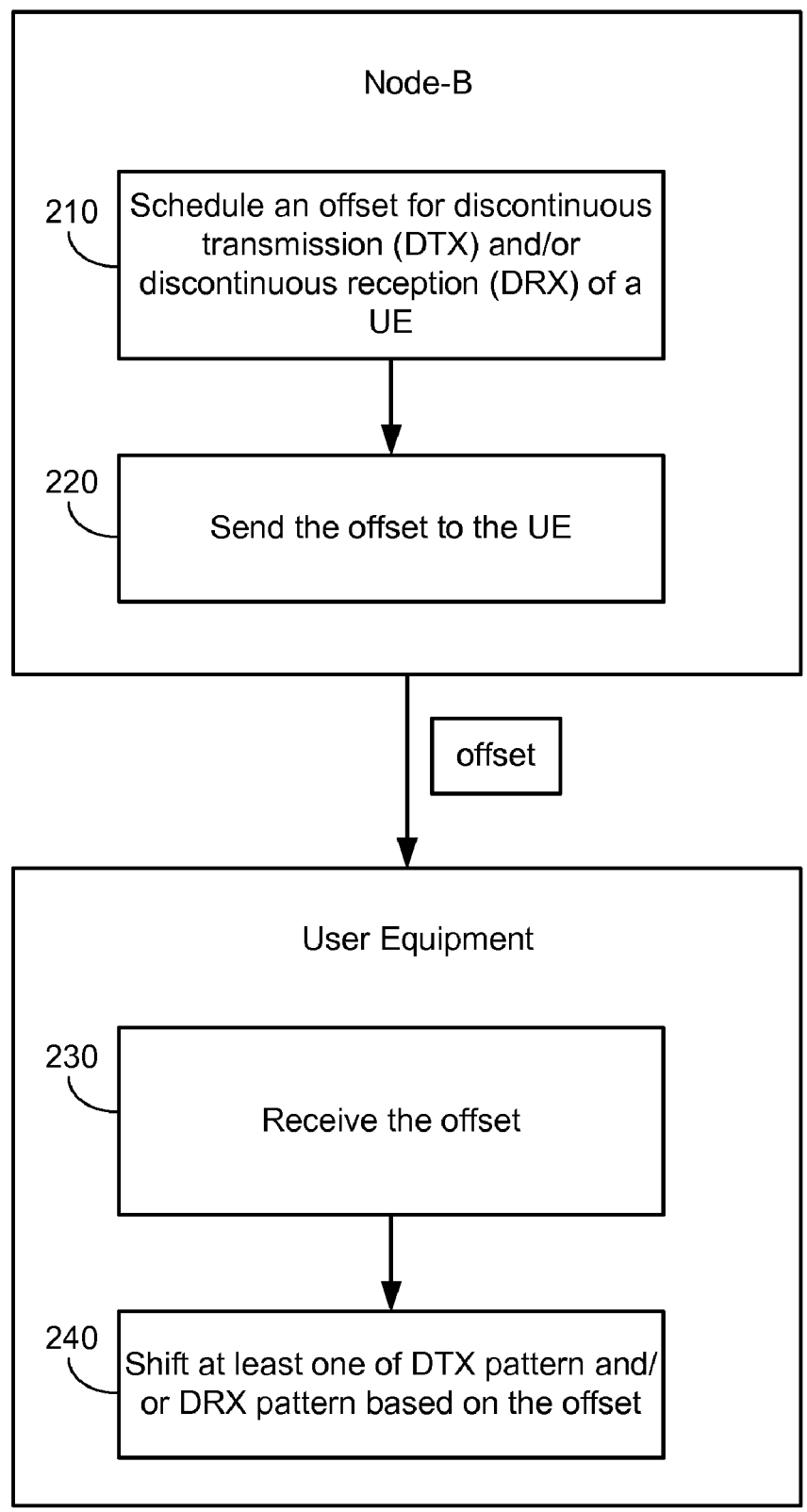
FIG. 2 shows an example process for controlling discontinuous transmission and reception.

FIG. 2 shows an example process for controlling discontinuous transmission and reception. At 210, a Node-B such as the Node-B 120 may schedule an offset for at least one of discontinuous transmission (DTX) and discontinuous reception (DRX) of a UE such as the UE 110. At 220, the Node-B 120 may send the offset to the UE. At 230, the UE 110 may receive the offset. At 240, the UE 110 may shift at least one of DTX pattern and DRX pattern based on the offset.

Figure 3:
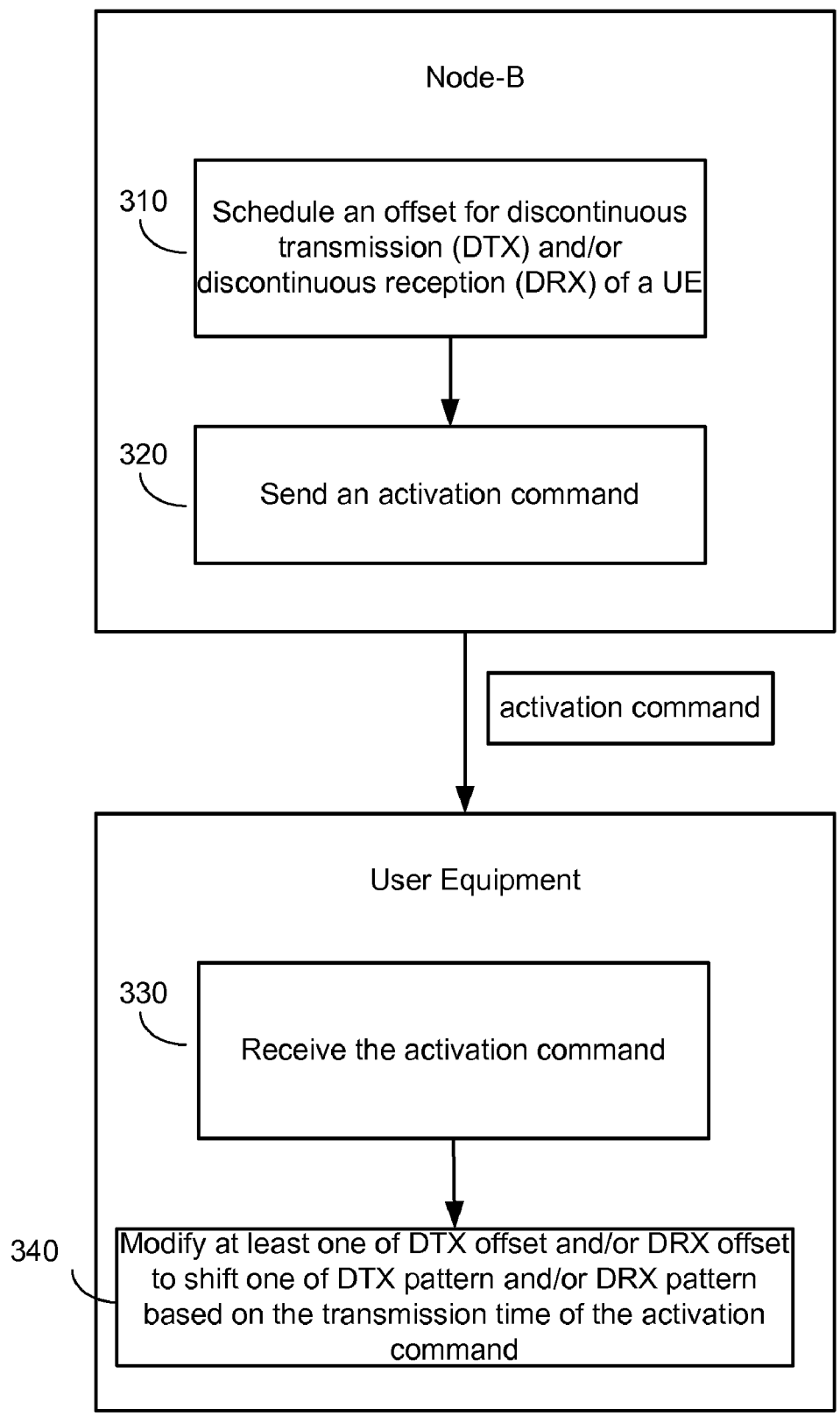
FIG. 3 shows an example process for controlling discontinuous transmission and reception.

FIG. 3 shows an example process for controlling discontinuous transmission and reception. At 310, a Node-B such as the Node-B 120 may schedule an offset for at least one of DTX and DRX of a UE such as the UE 110. At 320, the Node-B 120 may send an activation command to the UE 110. At 330, the UE 110 may receive the activation command for at least one of DTX and DRX. At 340, the UE 110 may modify an offset for at least one of DTX and DRX to shift at least one of DTX pattern and DRX pattern based on the transmission time of the activation command.

Figure 4:
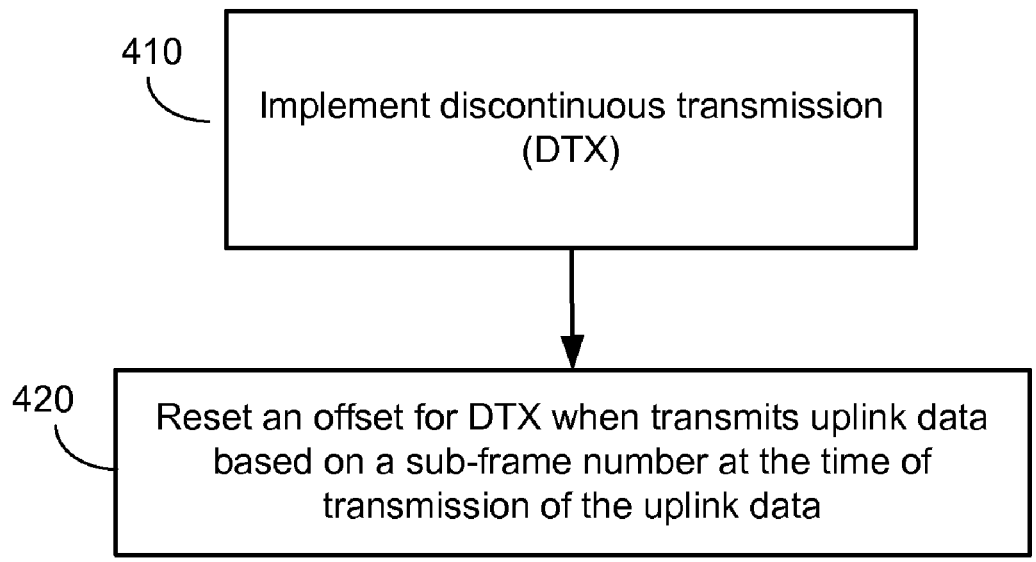
FIG. 4 shows an example process for controlling discontinuous transmission and reception.

FIG. 4 shows an example process for controlling discontinuous transmission and reception. At 410, a UE such as the UE 110 may implement DTX. At 420, the UE 110 may reset an offset for DTX when the UE 110 receives transmits uplink data based on a sub-frame number at the time of transmission of the uplink data.

Figure 5:
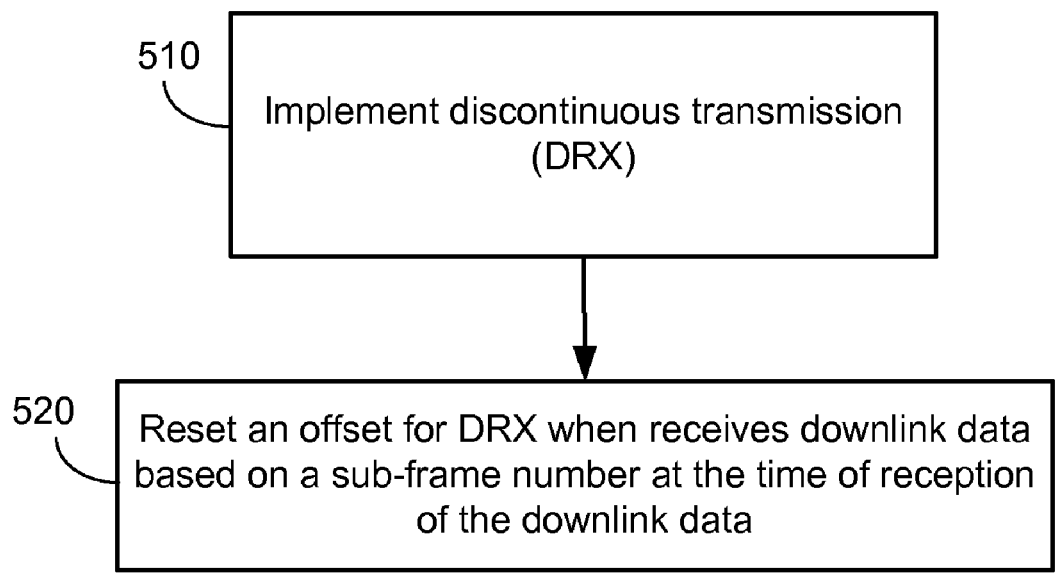
FIG. 5 shows an example process for controlling discontinuous transmission and reception.

FIG. 5 shows an example process for controlling discontinuous transmission and reception. At 510, a UE such as the UE 110 may implement DRX. At 520, the UE 110 may reset an offset for DRX when the UE 110 receives downlink data based on a sub-frame number at the time of reception of the downlink data.

Although the features and elements are described in the preferred embodiments in particular combinations, each feature or element can be used alone without the other features and elements of the preferred embodiments or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for controlling discontinuous transmission and reception, the method comprising:
   a Node-B scheduling an offset for at least one of discontinuous transmission (DTX) and discontinuous reception (DRX) of a user equipment (UE); and
   the Node-B sending the offset to the UE wherein the offset enables at least one of DTX pattern and DRX pattern to be shifted based on the received offset.

2. The method of claim 1 wherein the Node-B sends the offset via a high speed shared control channel (HS-SCCH).

3. The method of claim 2 wherein the Node-B uses special information bits in a type 2 HS-SCCH to send the offset.

4. The method of claim 3 wherein four (4) bits of the special information bits are used to indicate the offset and the remaining special information bits are used to indicate that the HS-SCCH transmission is related to a change of the offset.

5. The method of claim 3 further comprising:
   the Node-B assigning a subset of offset values to the UE beforehand, wherein the special information bits are used to indicate one of the subset of offset values.

6. The method of claim 1 wherein the offset is one of a UE_DTX_DRX_Offset for jointly controlling the DTX and the DRX, a DTX offset for controlling DTX only, and a DRX offset for controlling DRX only.

7. A method for controlling discontinuous transmission and reception, the method comprising:
   a Node-B scheduling an offset for at least one of discontinuous transmission (DTX) and discontinuous reception (DRX) of a user equipment (UE); and
   the Node-B sending an activation command to the UE, wherein the offset is modified to shift at least one of DTX pattern and DRX pattern based on the transmission time of the activation command.

8. The method of claim 7 wherein the offset is one of a UE_DTX_DRX_Offset for jointly controlling the DTX and the DRX, a DTX offset for controlling DTX only, and a DRX offset for controlling DRX only.

9. A method for controlling discontinuous transmission and reception, the method comprising:
   a user equipment (UE) receiving an offset for at least one of discontinuous transmission (DTX) and discontinuous reception (DRX); and
   the UE shifting at least one of DTX pattern and DRX pattern based on the offset.

10. The method of claim 9 wherein the UE receives the offset via a high speed shared control channel (HS-SCCH).

11. The method of claim 10 wherein special information bits in a type 2 HS-SCCH is used to send the offset.

12. The method of claim 11 wherein four (4) bits of the special information bits are used to indicate the offset and the remaining special information bits are used to indicate that the HS-SCCH transmission is related to a change of the offset.

13. The method of claim 11 wherein the special information bits are used to indicate one of a plurality of pre-assigned offset values.

14. The method of claim 9 wherein the offset is one of a UE_DTX_DRX_Offset for jointly controlling the DTX and the DRX, a DTX offset for controlling DTX only, and a DRX offset for controlling DRX only.

15. A method for controlling discontinuous transmission and reception, the method comprising:
   a user equipment (UE) receiving an activation command for at least one of discontinuous transmission (DTX) and discontinuous reception (DRX); and
   the UE modifying an offset for at least one of DTX and DRX to shift at least one of DTX pattern and DRX pattern based on the transmission time of the activation command.

16. The method of claim 15 wherein the offset is one of a UE_DTX_DRX_Offset for jointly controlling the DTX and the DRX, a DTX offset for controlling DTX only, and a DRX offset for controlling DRX only.

17. A method for controlling discontinuous transmission and reception, the method comprising:
   a user equipment (UE) implementing discontinuous transmission (DTX); and
   the UE resetting an offset for DTX when the UE transmits uplink data based on a sub-frame number at the time of transmission of the uplink data.

18. The method of claim 17 wherein the uplink transmission is via an enhanced dedicated physical data channel (E-DPDCH).

19. A method for controlling discontinuous transmission and reception, the method comprising:
   a user equipment (UE) implementing discontinuous reception (DRX); and
   the UE resetting an offset for DRX when the UE receives downlink data based on a sub-frame number at the time of reception of the downlink data.

20. The method of claim 19 wherein the downlink reception is via one of a high speed physical downlink shared channel (HS-PDSCH) and a high speed shared control channel (HS-SCCH).

21. A Node-B for controlling discontinuous transmission and reception, the Node-B comprising:
a scheduler for scheduling an offset for at least one of discontinuous transmission (DTX) and discontinuous reception (DRX) of a user equipment (UE); and
a transceiver for sending the offset to the UE, wherein the offset enables at least one of DTX pattern and DRX pattern to be shifted based on the received offset.

22. The Node-B of claim 21 wherein the transceiver sends the offset via a high speed shared control channel (HS-SCCH).

23. The Node-B of claim 22 wherein the transceiver uses special information bits in a type 2 HS-SCCH to send the offset.

24. The Node-B of claim 23 wherein four (4) bits of the special information bits are used to indicate the offset and the remaining special information bits are used to indicate that the HS-SCCH transmission is related to a change of the offset.

25. The Node-B of claim 23 wherein the scheduler assigns a subset of offset values to the UE beforehand, wherein the special information bits are used to indicate one of the subset of offset values.

26. The Node-B of claim 21 wherein the offset is one of a UE_DTX_DRX_Offset for jointly controlling the DTX and the DRX, a DTX offset for controlling DTX only, and a DRX offset for controlling DRX only.

27. A Node-B for controlling discontinuous transmission and reception, the Node-B comprising:
a transceiver; and
a scheduler for scheduling an offset for at least one of discontinuous transmission (DTX) and discontinuous reception (DRX) of a user equipment (UE), and sending an activation command to the UE, wherein the offset is modified to shift at least one of DTX pattern and DRX pattern based on the transmission time of the activation command.

28. The Node-B of claim 27 wherein the offset is one of a UE_DTX_DRX_Offset for jointly controlling the DTX and the DRX, a DTX offset for controlling DTX only, and a DRX offset for controlling DRX only.

29. A user equipment (UE) for controlling discontinuous transmission and reception, the UE comprising:
a transceiver for receiving an offset for at least one of discontinuous transmission (DTX) and discontinuous reception (DRX) from a Node-B while implementing at least one of DTX and DRX; and
a controller for shifting at least one of DTX pattern and DRX pattern based on the received offset.

30. The UE of claim 29 wherein the transceiver receives the offset via a high speed shared control channel (HS-SCCH).

31. The UE of claim 30 wherein special information bits in a type 2 HS-SCCH is used to send the offset.

32. The UE of claim 30 wherein four (4) bits of the special information bits are used to indicate the offset and the remaining special information bits are used to indicate that the HS-SCCH transmission is related to a change of the offset.

33. The UE of claim 31 wherein the special information bits are used to indicate one of a plurality of pre-assigned offset values.

34. The UE of claim 29 wherein the offset is one of a UE_DTX_DRX_Offset for jointly controlling the DTX and the DRX, a DTX offset for controlling DTX only, and a DRX offset for controlling DRX only.

35. A user equipment (UE) for controlling discontinuous transmission and reception, the UE comprising:
a transceiver for receiving an activation command for at least one of discontinuous transmission (DTX) and discontinuous reception (DRX); and
a controller for modifying at least one of DTX offset and DRX offset to shift one of DTX pattern and DRX pattern based on the transmission time of the activation command.

36. The UE of claim 35 wherein the offset is one of a UE_DTX_DRX_Offset for jointly controlling the DTX and the DRX, a DTX offset for controlling DTX only, and a DRX offset for controlling DRX only.

37. A user equipment (UE) for controlling discontinuous transmission, the UE comprising:
a transceiver; and
a controller for resetting an offset for discontinuous transmission (DTX) when the UE transmits uplink data based on a sub-frame number at the time of transmission of the uplink data.

38. The UE of claim 37 wherein the uplink transmission is via an enhanced dedicated physical data channel (E-DPDCH).

39. A user equipment (UE) for controlling discontinuous reception, the UE comprising:
a transceiver; and
a controller for resetting an offset for discontinuous reception (DRX) when the UE receives downlink data based on a sub-frame number at the time of reception of the downlink data.

40. The UE of claim 39 wherein the downlink reception is via one of a high speed physical downlink shared channel (HS-PDSCH) and a high speed shared control channel (HS-SCCH).

* * * * *